(12) United States Patent
Lemons et al.

(10) Patent No.: US 7,960,637 B2
(45) Date of Patent: Jun. 14, 2011

(54) ARCHIVING OF ENVIRONMENTAL SOUNDS USING VISUALIZATION COMPONENTS

(75) Inventors: Kenneth R. Lemons, Indianapolis, IN (US); Tevlin Schuetz, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 463 days.

(21) Appl. No.: 12/148,569

(22) Filed: Apr. 21, 2008

(65) Prior Publication Data

US 2008/0264239 A1    Oct. 30, 2008

Related U.S. Application Data

(60) Provisional application No. 60/912,967, filed on Apr. 20, 2007, provisional application No. 61/025,394, filed on Feb. 1, 2008.

(51) Int. Cl.
| G09B 15/02 | (2006.01) |
| A63J 17/00 | (2006.01) |
| A63J 5/10 | (2006.01) |
| G10H 1/00 | (2006.01) |

(52) U.S. Cl. .................................. 84/464 R; 84/483.2
(58) Field of Classification Search ............... 84/470 R, 84/471 R, 472, 464 R, 483.2
See application file for complete search history.

(56) References Cited

U.S. PATENT DOCUMENTS

| 347,686 A | 8/1886 | Carpenter et al. |
| 2,804,500 A | 8/1957 | Giacoletto |
| 3,698,277 A | 10/1972 | Barra |
| 3,969,972 A | 7/1976 | Bryant |
| 4,128,846 A | 12/1978 | Robinson, Jr. |
| 4,172,406 A | 10/1979 | Martinez |
| 4,257,062 A | 3/1981 | Meredith |
| 4,378,466 A | 3/1983 | Esser |
| 4,526,168 A | 7/1985 | Hassler et al. |
| 4,887,507 A | 12/1989 | Shaw |
| 4,907,573 A | 3/1990 | Nagasaki |
| 5,048,390 A | 9/1991 | Adachi et al. |
| 5,207,214 A | 5/1993 | Romano |
| 5,370,539 A | 12/1994 | Dillard |
| 5,415,071 A | 5/1995 | Davies |
| 5,563,358 A | 10/1996 | Zimmerman |
| 5,741,990 A | 4/1998 | Davies |
| 5,784,096 A | 7/1998 | Paist |

(Continued)

FOREIGN PATENT DOCUMENTS

EP    0349686 A1    1/1990

(Continued)

OTHER PUBLICATIONS

"Time-line of the Music Animation Machine (and related experiments)", Music Animation Machine: History, http://www.musanim.com/mam/mamhist.htm, pp. 1-5, p. 1, pp. 1-2, pp. 1-2 & p. 1 printed Aug. 30, 2007.

(Continued)

*Primary Examiner* — Jeffrey Donels
(74) *Attorney, Agent, or Firm* — Woodard Emhardt Moriarty McNett & Henry LLP

(57) ABSTRACT

The present disclosure relates to sound recognition devices and methods. A system is provided that utilizes a system of tonal and rhythmic visualization methods to recognize different environmental sounds so as to accurately identify certain species of wildlife and other elements of nature.

16 Claims, 16 Drawing Sheets
(12 of 16 Drawing Sheet(s) Filed in Color)

U.S. PATENT DOCUMENTS

| | | | |
|---|---|---|---|
| 6,031,172 | A | 2/2000 | Papadopoulos |
| 6,111,755 | A | 8/2000 | Park |
| 6,127,616 | A | 10/2000 | Yu |
| 6,137,041 | A | 10/2000 | Nakano |
| 6,201,769 | B1 | 3/2001 | Lewis |
| 6,245,981 | B1 | 6/2001 | Smith |
| 6,265,651 | B1 | 7/2001 | Landtroop |
| 6,350,942 | B1 | 2/2002 | Thomson |
| 6,390,923 | B1 | 5/2002 | Yoshitomi et al. |
| 6,392,131 | B2 | 5/2002 | Boyer |
| 6,407,323 | B1 | 6/2002 | Karapetian |
| 6,411,289 | B1 | 6/2002 | Zimmerman |
| 6,414,230 | B2 | 7/2002 | Randall |
| 6,448,487 | B1 | 9/2002 | Smith |
| 6,544,123 | B1 | 4/2003 | Tanaka et al. |
| 6,686,529 | B2 | 2/2004 | Kim |
| 6,750,386 | B2 | 6/2004 | King |
| 6,791,568 | B2 | 9/2004 | Steinberg et al. |
| 6,841,724 | B2 | 1/2005 | George |
| 6,856,329 | B1 | 2/2005 | Peevers et al. |
| 6,927,331 | B2 | 8/2005 | Haase |
| 6,930,235 | B2 | 8/2005 | Sandborn et al. |
| 6,987,220 | B2 | 1/2006 | Holcome |
| 7,030,307 | B2 | 4/2006 | Wedel |
| 7,096,154 | B1 | 8/2006 | Adrade-Cetto |
| 7,153,139 | B2 | 12/2006 | Wen et al. |
| 7,182,601 | B2 | 2/2007 | Donnan |
| 7,202,406 | B2 | 4/2007 | Coleman |
| 7,212,213 | B2 | 5/2007 | Steinberg et al. |
| 7,271,328 | B2 | 9/2007 | Pangrie |
| 7,271,329 | B2 | 9/2007 | Franzblau |
| 7,400,361 | B2 | 7/2008 | Noske et al. |
| 7,439,438 | B2 | 10/2008 | Hao |
| 7,521,619 | B2 | 4/2009 | Salter |
| 7,538,265 | B2 | 5/2009 | Lemons |
| 7,667,125 | B2 | 2/2010 | Taub et al. |
| 7,714,222 | B2 | 5/2010 | Taub et al. |
| 2002/0050206 | A1 | 5/2002 | MacCutcheon |
| 2002/0176591 | A1* | 11/2002 | Sandborn et al. ............ 381/118 |
| 2003/0205124 | A1 | 11/2003 | Foote et al. |
| 2004/0089132 | A1 | 5/2004 | Georges et al. |
| 2004/0148575 | A1* | 7/2004 | Haase ............ 715/528 |
| 2004/0206225 | A1 | 10/2004 | Wedel |
| 2005/0190199 | A1 | 9/2005 | Brown et al. |
| 2005/0241465 | A1 | 11/2005 | Goto |
| 2006/0107819 | A1 | 5/2006 | Salter |
| 2006/0132714 | A1 | 6/2006 | Nease et al. |
| 2007/0044639 | A1 | 3/2007 | Farbood et al. |
| 2007/0157795 | A1 | 7/2007 | Hung |
| 2007/0180979 | A1 | 8/2007 | Rosenberg |
| 2008/0022842 | A1 | 1/2008 | Lemons |
| 2008/0034947 | A1 | 2/2008 | Sumita |
| 2008/0115656 | A1 | 5/2008 | Sumita |
| 2008/0190271 | A1 | 8/2008 | Taub et al. |
| 2008/0245212 | A1 | 10/2008 | Lemons |
| 2008/0264239 | A1 | 10/2008 | Lemons et al. |
| 2008/0271589 | A1 | 11/2008 | Lemons |
| 2008/0271590 | A1 | 11/2008 | Lemons |
| 2008/0271591 | A1 | 11/2008 | Lemons |
| 2008/0276790 | A1 | 11/2008 | Lemons |
| 2008/0276791 | A1 | 11/2008 | Lemons |
| 2008/0276793 | A1 | 11/2008 | Yamashita et al. |
| 2008/0314228 | A1 | 12/2008 | Dreyfuss et al. |
| 2009/0223348 | A1 | 9/2009 | Lemons |
| 2010/0154619 | A1 | 6/2010 | Taub et al. |

FOREIGN PATENT DOCUMENTS

| | | |
|---|---|---|
| EP | 1354561 | 1/1990 |
| EP | 456 860 A1 | 11/1991 |
| JP | 05-232856 | 9/1993 |
| JP | 2004-226556 A | 8/2004 |
| KR | 10-2006-0110988 | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/surfaces_curves/harmonograph/, pp. 1-6, printed Aug. 30, 2007.

Dunne, Gabriel, "Color/Shape/Sound Ratio & Symmetry Calculator," Quilime.com—Symmetry Calculator, https://www.quilime.com/content/colorcalc/, pp. 1-6, printed Jul. 3, 2007.

Patent Application Search Report mailed on Sep. 18, 2008 for PCT/US2008/005072.

Patent Application Search Report mailed on Sep. 18, 2008 for PCT/US2008/005124.

Patent Application Search Report mailed on Sep. 29, 2008 for PCT/US2008/005074.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005069.

Patent Application Search Report mailed on Aug. 18, 2008 for PCT/US2008/005073.

Patent Application Search Report mailed on Aug. 18, 2008 for PCT/US2008/005126.

Patent Application Search Report mailed on Aug. 21, 2008 for PCT/US2008/005076.

Patent Application Search Report mailed on Aug. 27, 2008 for PCT/US2008/005075.

Patent Application Search Report mailed on Aug. 28, 2008 for PCT/US2008/005077.

Patent Application Search Report Mailed on Jul. 31, 2008 for PCT/US2008/005070.

Patent Application Search Report mailed on Sep. 24, 2008 for PCT/US2008/005125.

Rabiner, Huang, "Fundamentals of Speech Recognition," PTR Prentice-hall, Inc., 1993, ISBN 0-13-285826-6, pp. 21-31, Fig. 2.17, 2.32.

Patent Application Search Report mailed on Aug. 25, 2009 for PCT/US2009/000684.

Written Opinion mailed on Aug. 25, 2009 for PCT/US2009/00684.

* cited by examiner

US 7,960,637 B2

ARCHIVING OF ENVIRONMENTAL SOUNDS USING VISUALIZATION COMPONENTS

CROSS-REFERENCE TO RELATED APPLICATIONS

The present application claims the benefit of U.S. Provisional Patent Application Ser. No. 60/912,967, filed Apr. 20, 2007, entitled "Archiving of Environmental Sounds Using Visualization Components" and U.S. Provisional Patent Application Ser. No. 61/025,394, filed Feb. 1, 2008, entitled "Apparatus and Method for Visualizing and Identifying Bird Calls." This application also relates to U.S. Provisional Patent Application Ser. No. 60/830,386 filed Jul. 12, 2006 entitled "Apparatus and Method for Visualizing Musical Notation", U.S. Utility patent application Ser. No. 11/827,264 filed Jul. 11, 2007 entitled "Apparatus and Method for Visualizing Music and Other Sounds", U.S. Provisional Patent Application Ser. No. 60/921,578, filed Apr. 3, 2007, entitled "Device and Method for Visualizing Musical Rhythmic Structures", and U.S. Utility patent application Ser. No. 12/023,375 filed Jan. 31, 2008 entitled "Device and Method for Visualizing Musical Rhythmic Structures". All of these applications are hereby incorporated by reference in their entirety.

TECHNICAL FIELD OF THE DISCLOSURE

The present disclosure relates generally to sound recognition and, more specifically, to a system and method for recognizing and archiving environmental sounds using analysis of tonal and rhythmic structures.

BACKGROUND OF THE DISCLOSURE

Naturalists as well as weekend campers and occasional hikers often encounter the sounds of birdcalls or other wildlife without actually seeing the creature making the sound. Often, the only way to determine the general location of a camouflaged or hidden animal is to listen for its auditory call. If the observer is able to identify a species based on the perceived call, he will be able to look for an animal with visual markings common to that species. In addition to ease of visually locating birds and other animals, the identification of the auditory call is itself a source of interest and enjoyment. One problem for animal or bird watchers, however, is that there are thousands, perhaps millions, of species, each exhibiting a unique call or song. This makes it difficult for recreational or inexperienced observers to identify a bird or other animal by its auditory call alone, particularly for species not normally expected to inhabit the given geographic viewing area. Methods and devices are needed to improve accuracy and efficiency when identifying environmental sounds, such as those generated by birds and other wildlife.

SUMMARY OF THE INVENTION

Accordingly, in one aspect, an environmental sound recognition system is disclosed, comprising a sound input device; a processing device; and a display; wherein said processing device executes computer readable code to create a first visual representation of a first sound sensed by the sound input device for output on the display; wherein said first visual representation is evaluated to determine the identity of a wildlife species; and wherein said first visual representation is generated according to a method comprising the steps of: (a) labeling the perimeter of a circle with a plurality of labels corresponding to a plurality of equally spaced frequency intervals in an octave, such that moving clockwise or counter-clockwise between adjacent ones of said labels represents a first frequency interval; (b) identifying an occurrence of a first frequency within the first sound; (c) identifying an occurrence of a second frequency within the first sound; (d) identifying a first label corresponding to the first frequency; (e) identifying a second label corresponding to the second frequency; (f) creating a first line connecting the first label and the second label.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
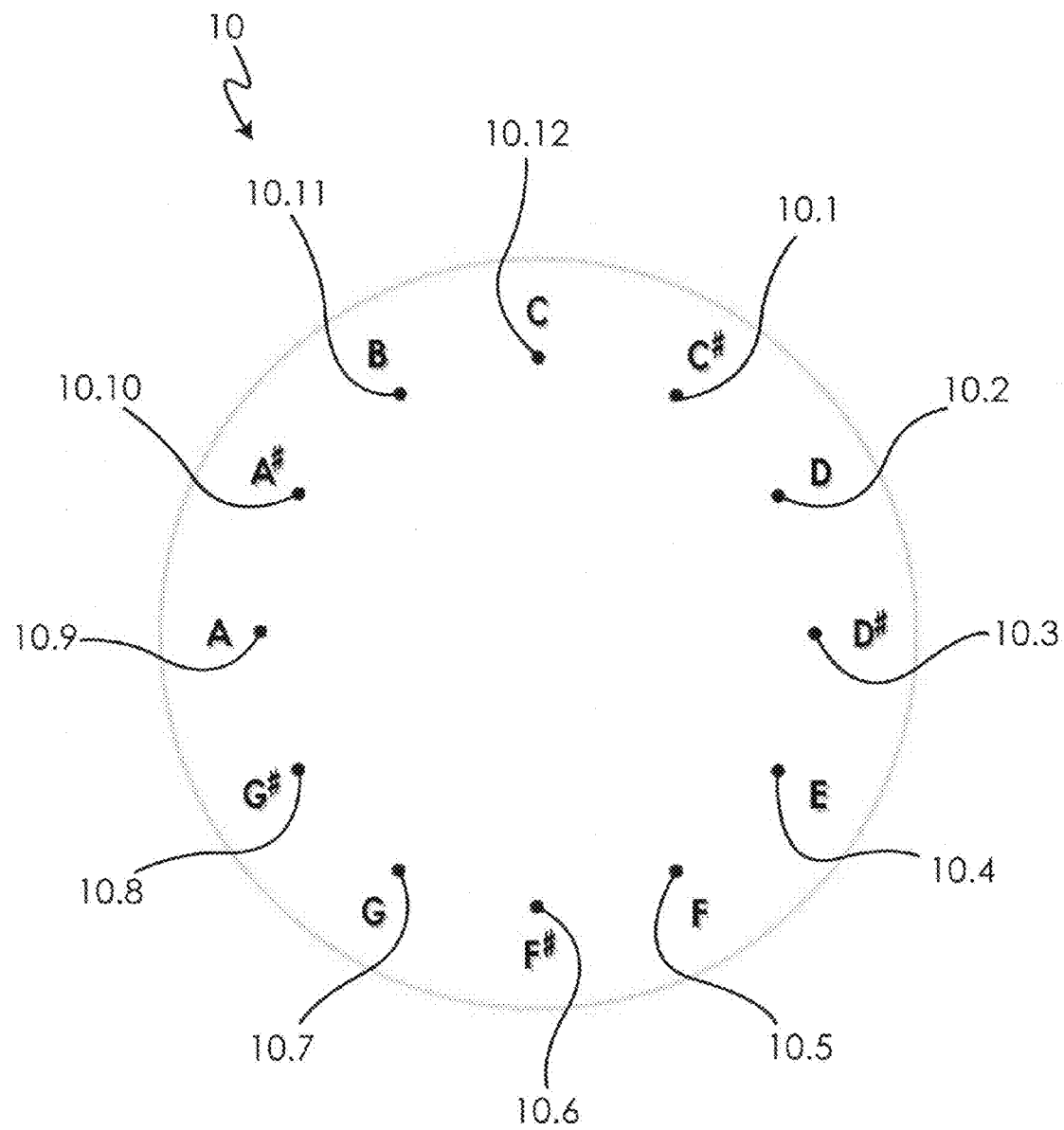
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the system and method for archiving environmental sounds, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference in its entirety.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

| | |
|---|---|
| Major scale: | 2 steps, 2 steps, 1 step, 2 steps, 2 steps, 2 steps, 1 step |
| Harmonic Minor Scale: | 2, 1, 2, 2, 1, 3, 1 |
| Melodic Minor Scale: | 2, 1, 2, 2, 2, 2, 1 |

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (♯'s) and 'flats' (♭'s) to cover the remaining five tones so that a single notation system can be used to encompass all three scales. For example, certain key signatures will have seven 'pure letter' tones (like 'A') in addition to sharp or flat tones (like C♯ or G♯), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., A♯ is the same as B♭), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
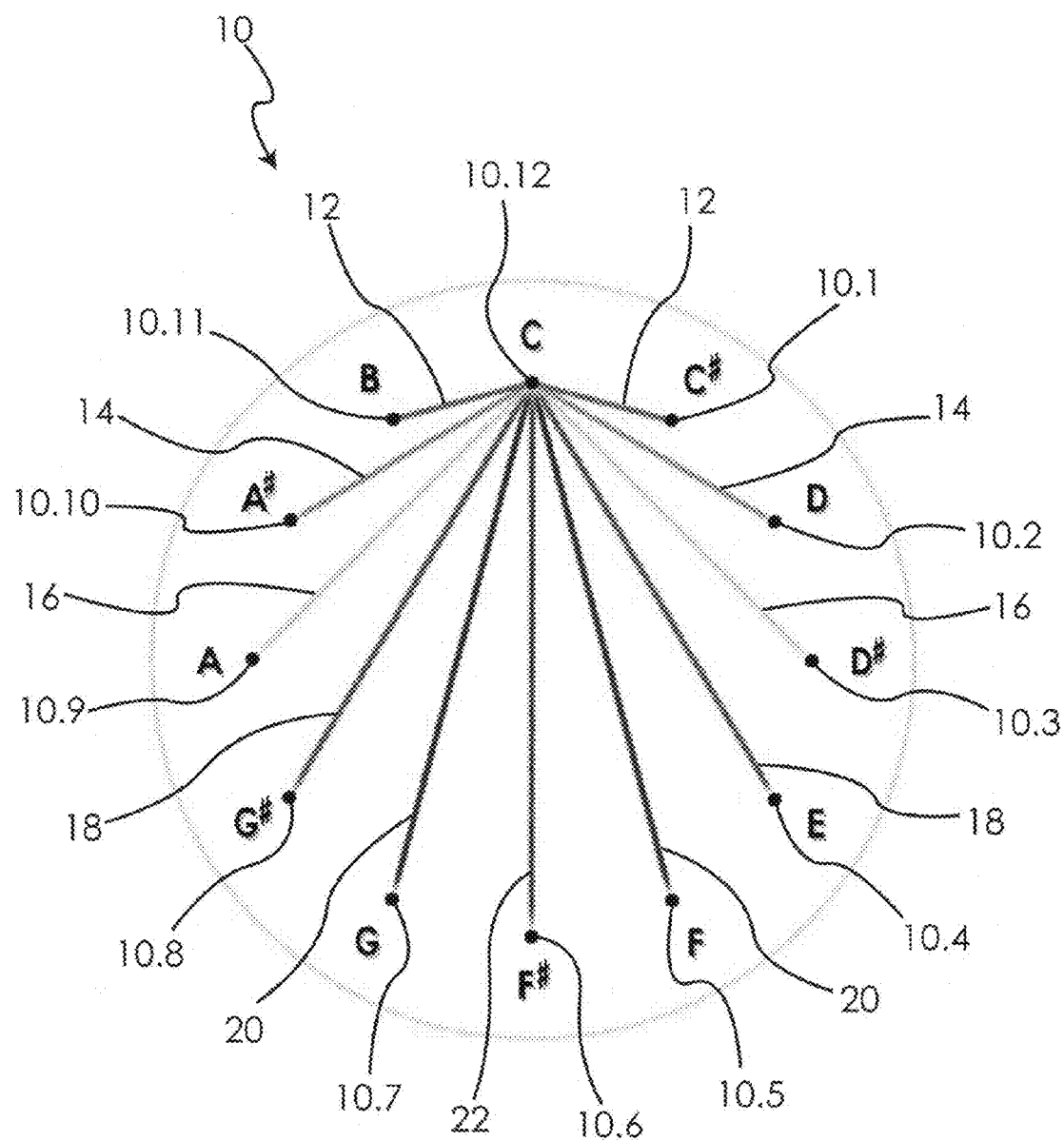
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines-their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and A♯ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
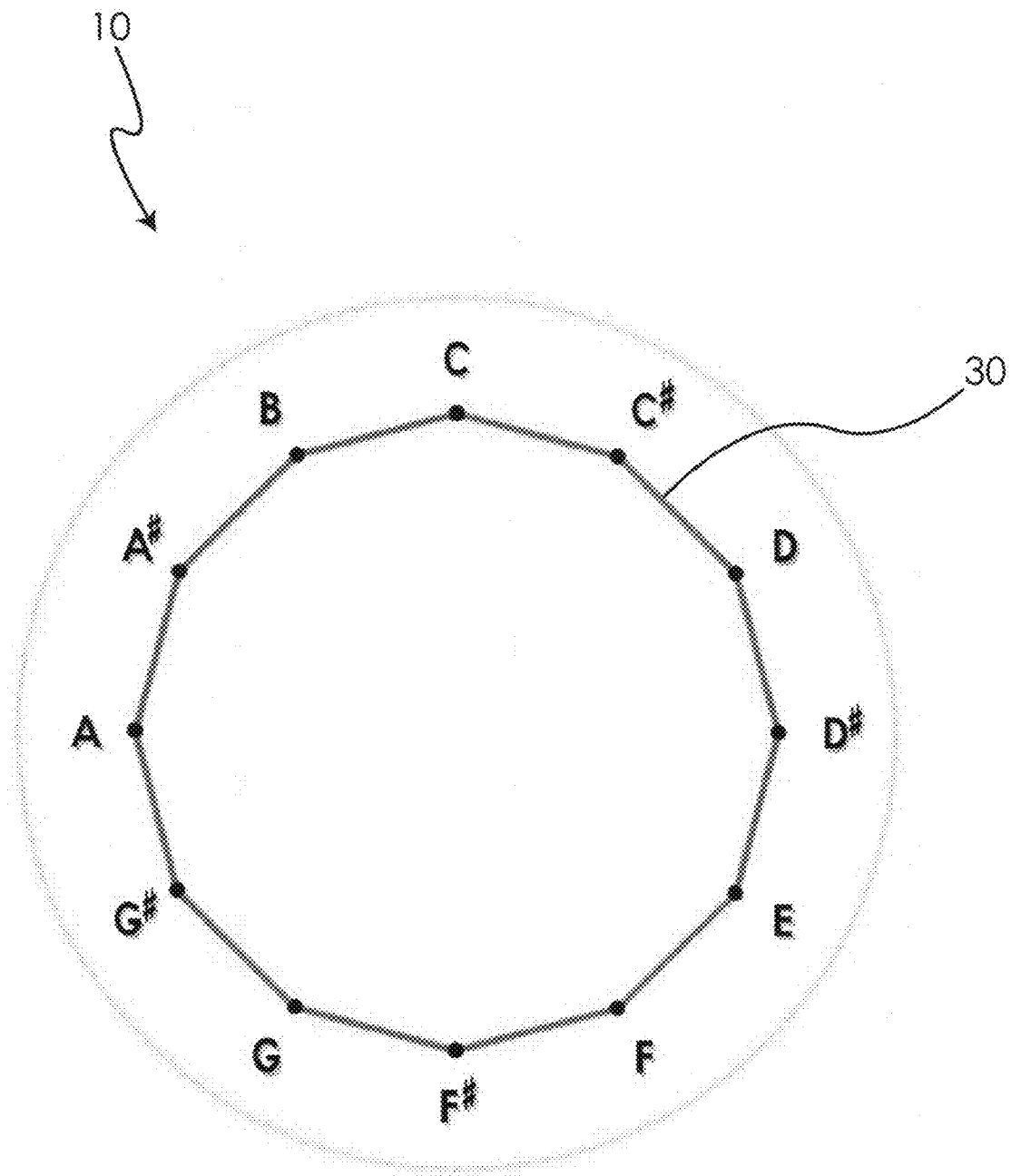
FIG. 3 is a diagram of a twelve-tone circle showing the chromatic scale.
Figure 4:
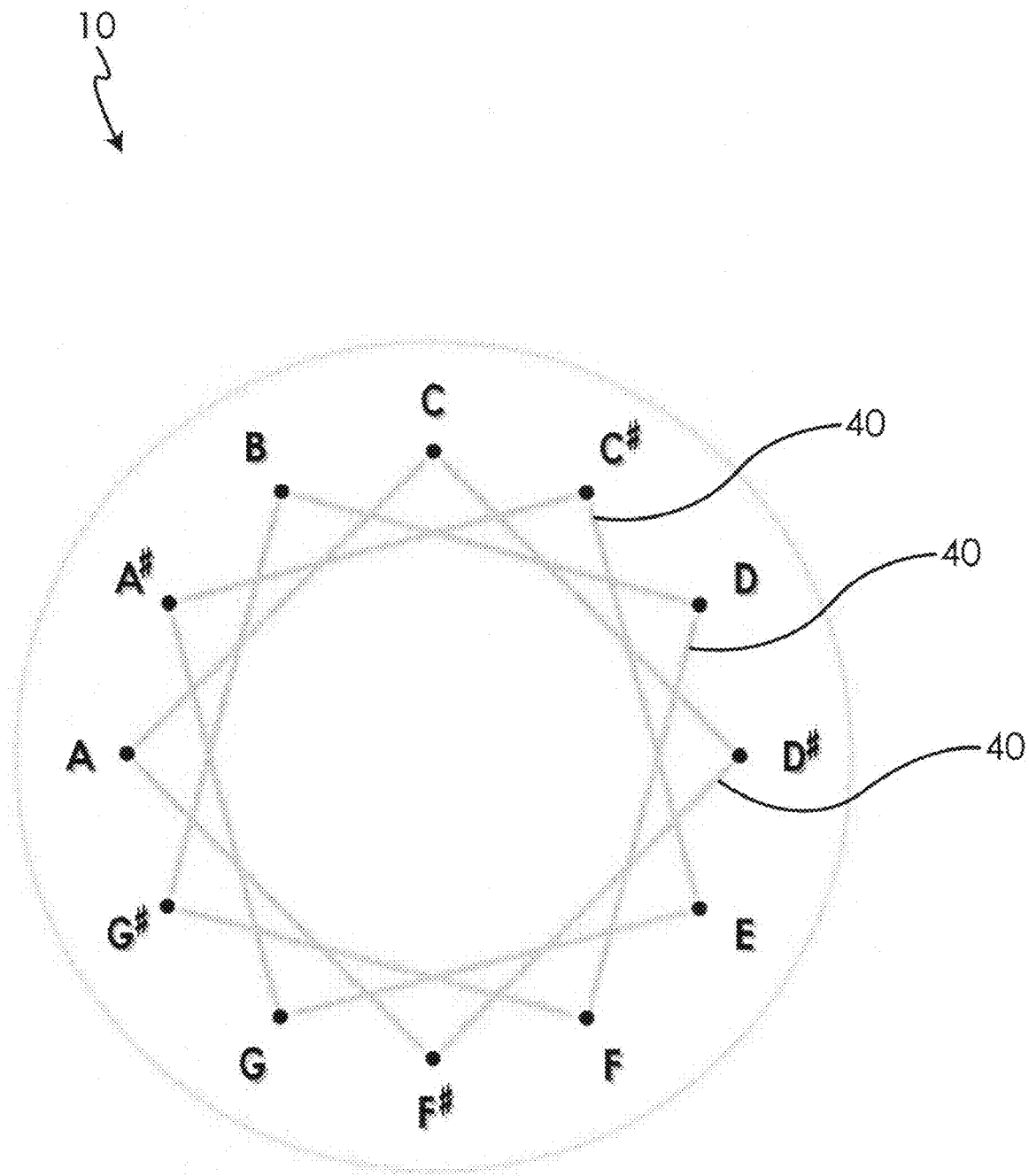
FIG. 4 is a diagram of a twelve-tone circle showing the first through third diminished scales.
Figure 5:
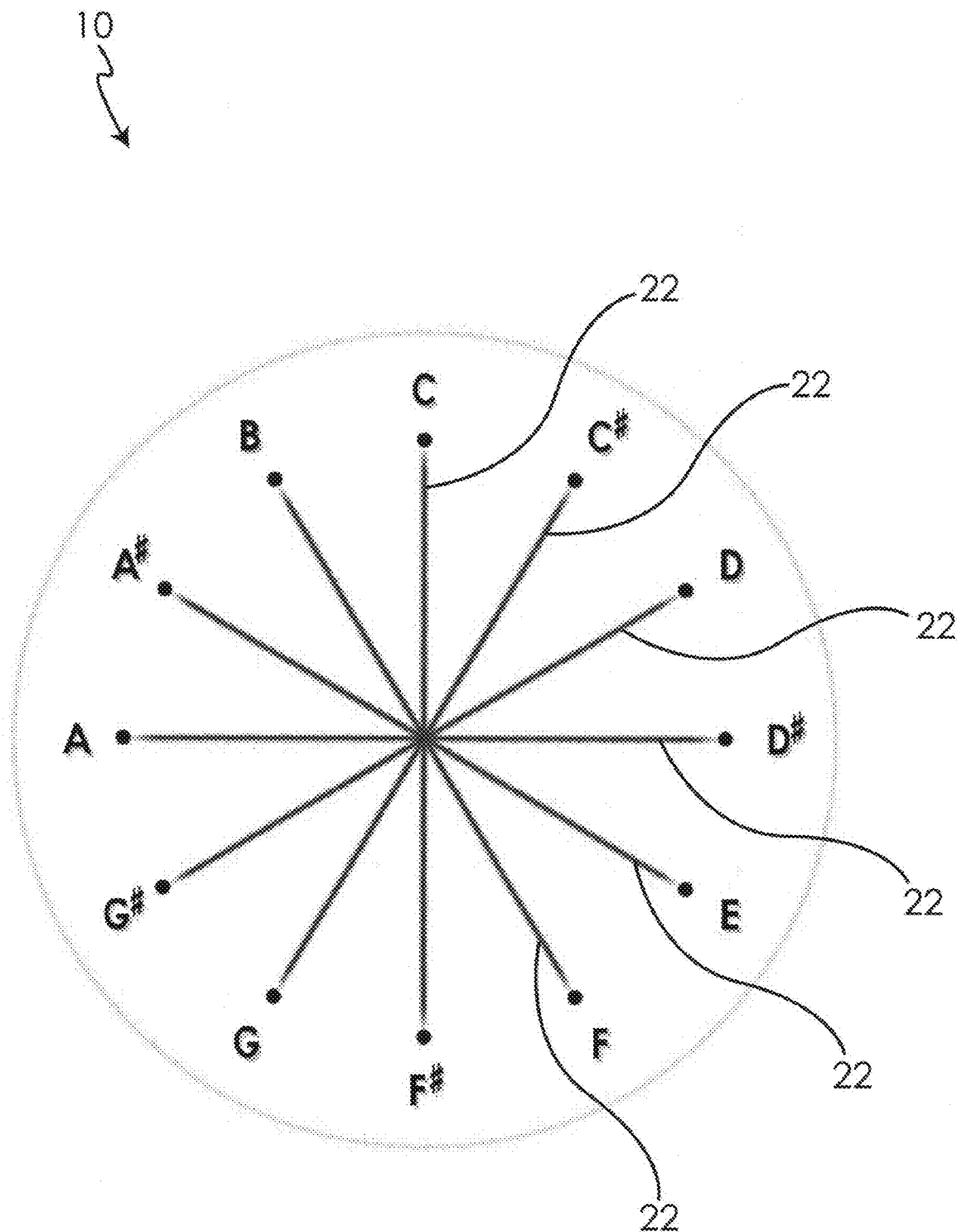
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
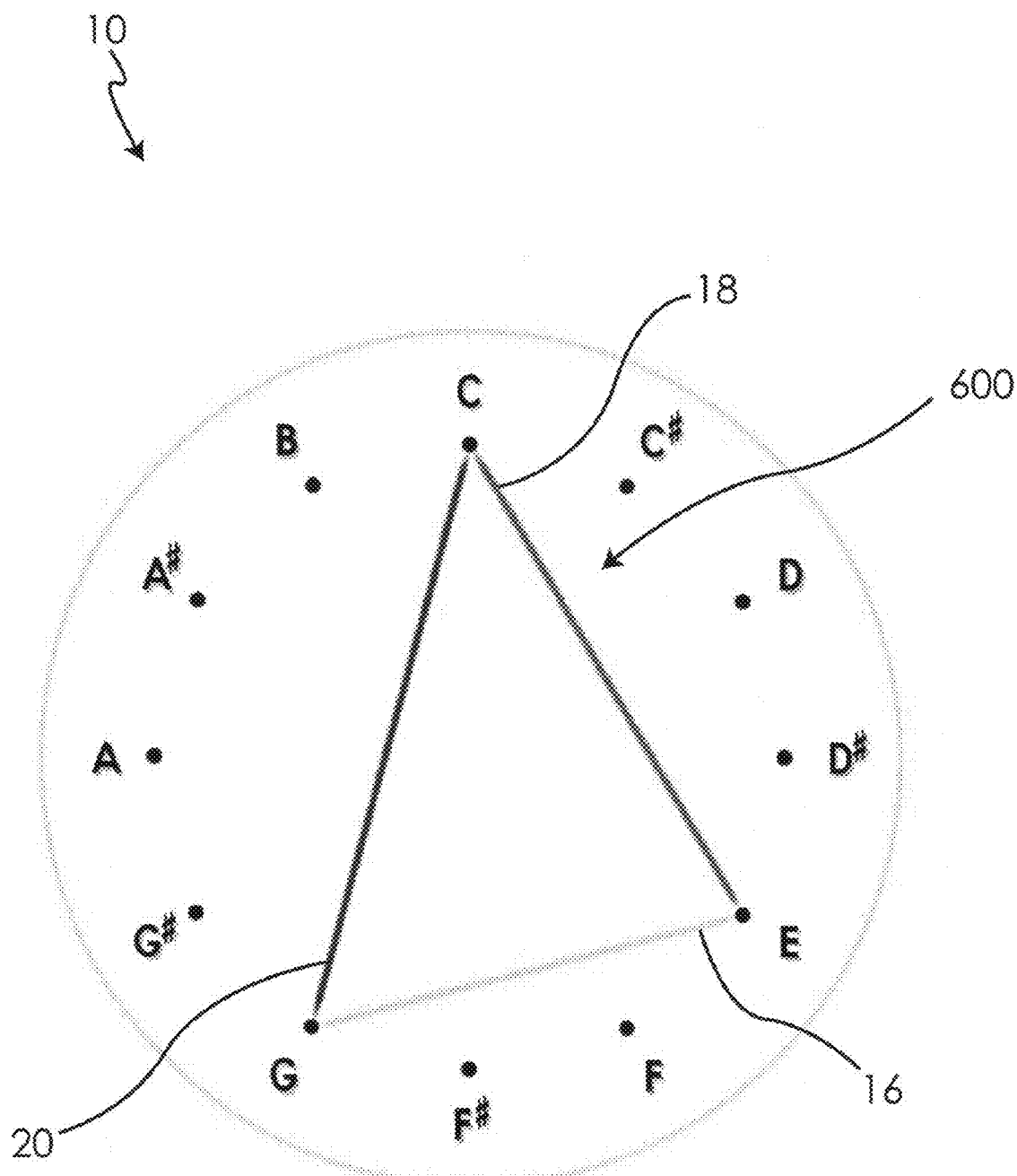
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
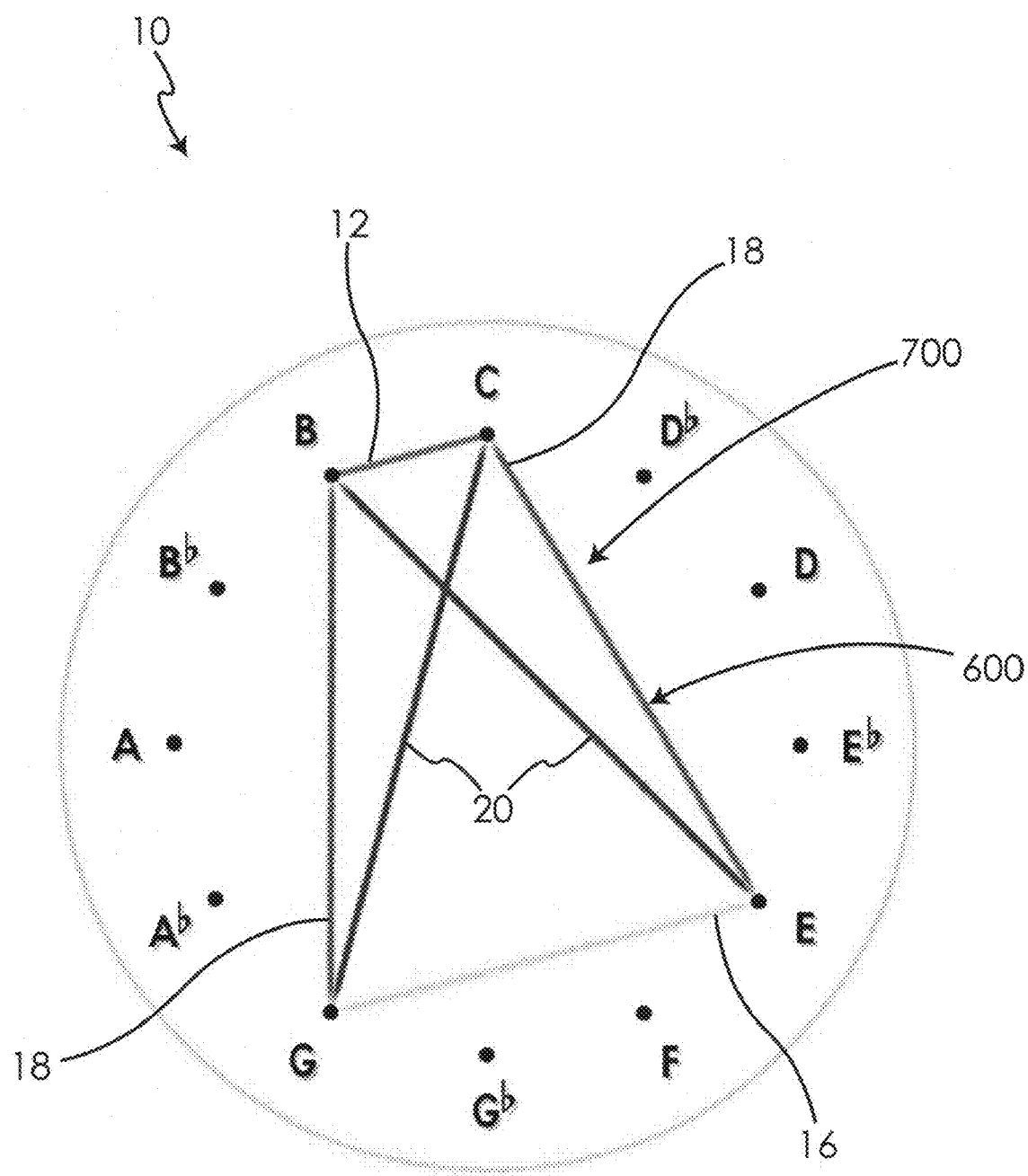
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
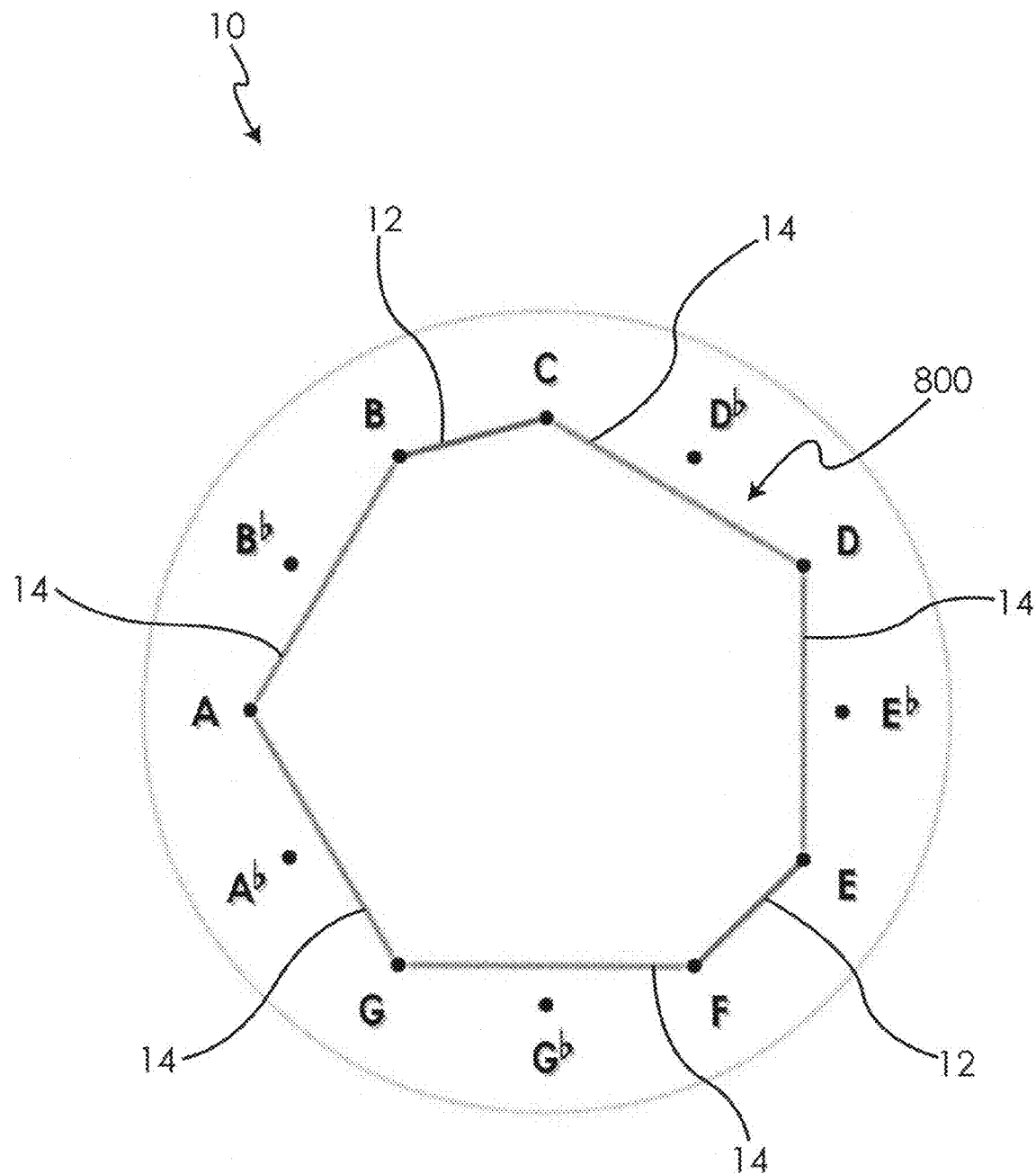
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
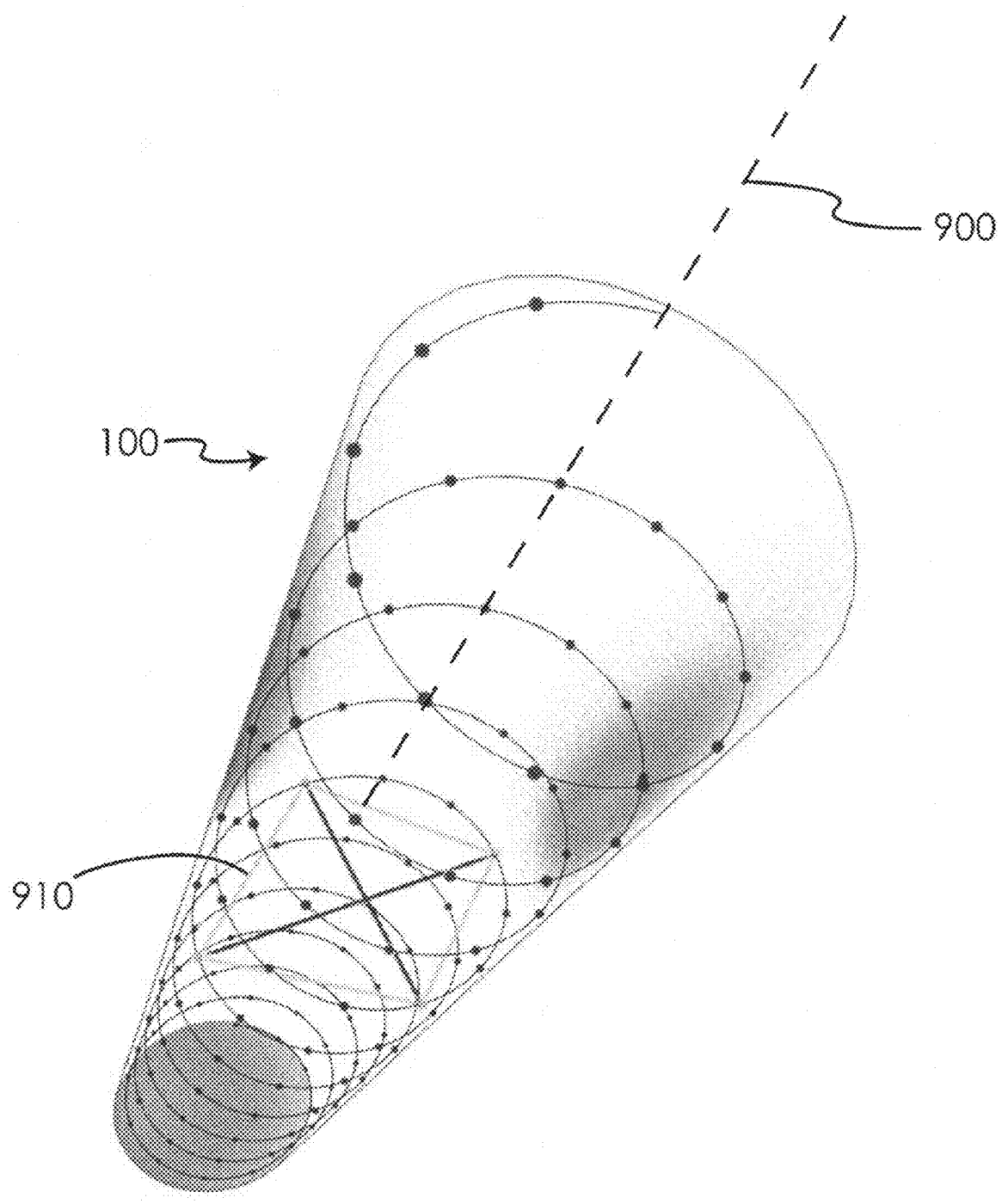
FIGS. 9-10 are diagrams of a helix showing a B diminished seventh chord.
Figure 10:
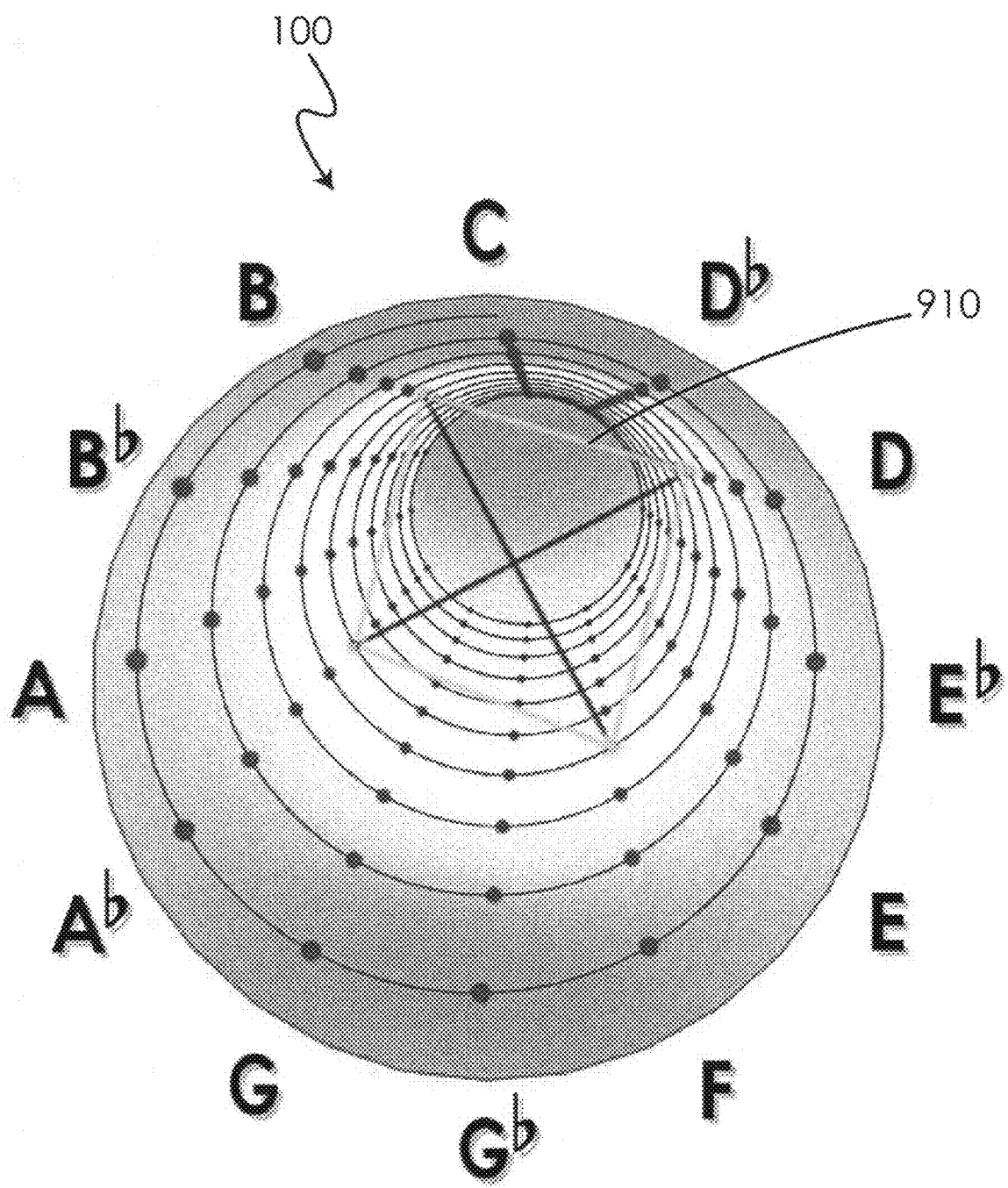

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
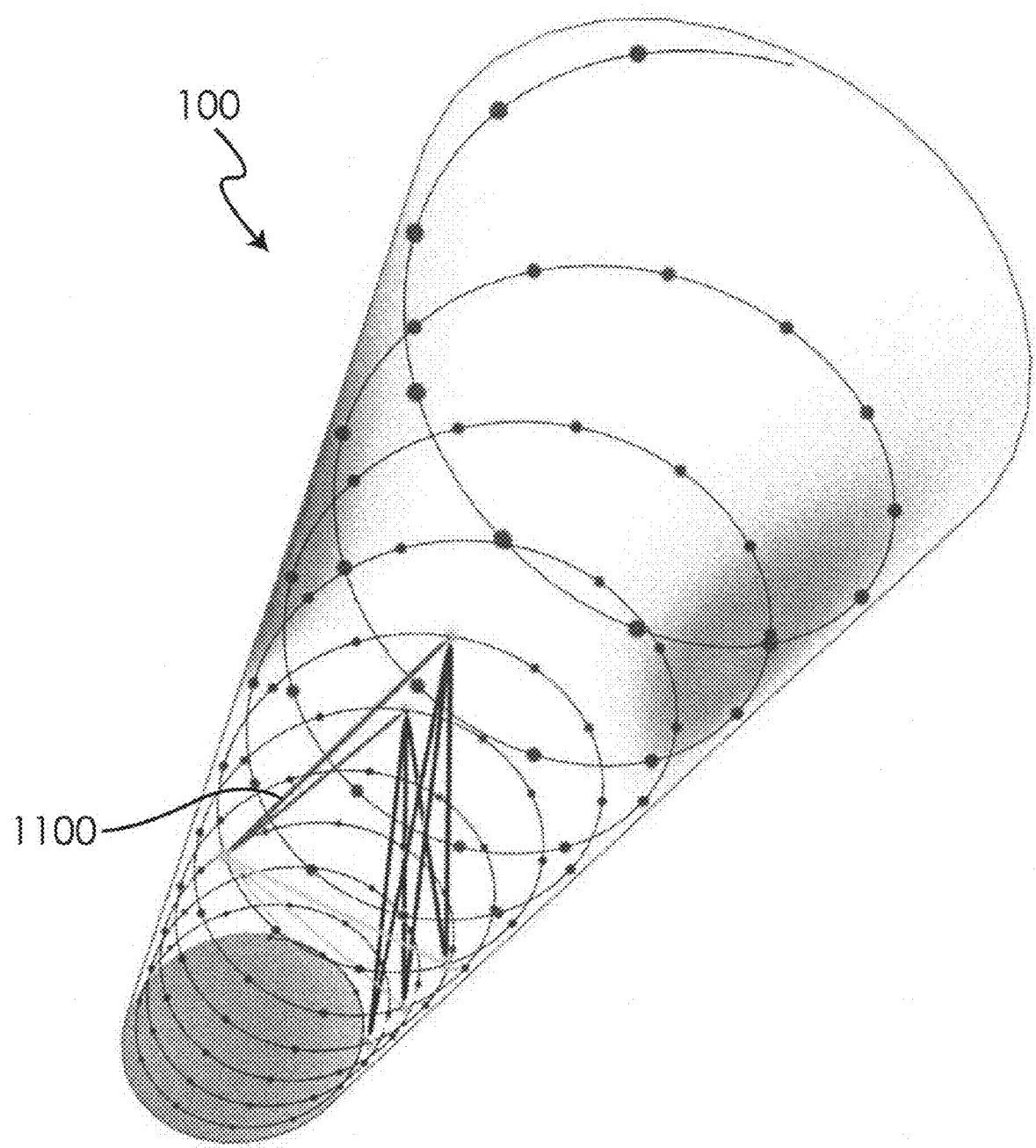
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 filed Jan. 31, 2008 entitled "Device and Method for Visualizing Musical Rhythmic Structures" which is also hereby incorporated by reference in its entirety.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
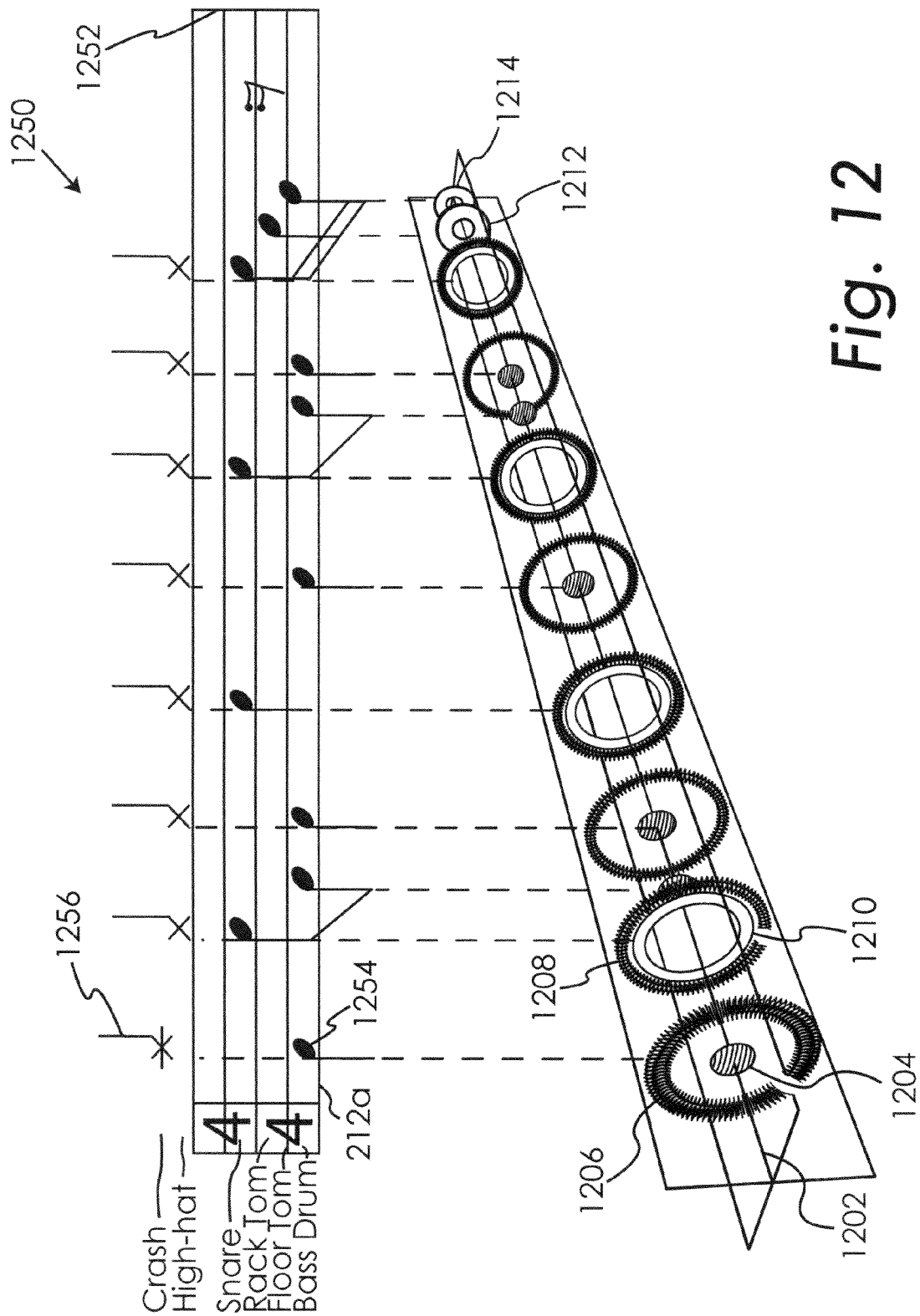
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
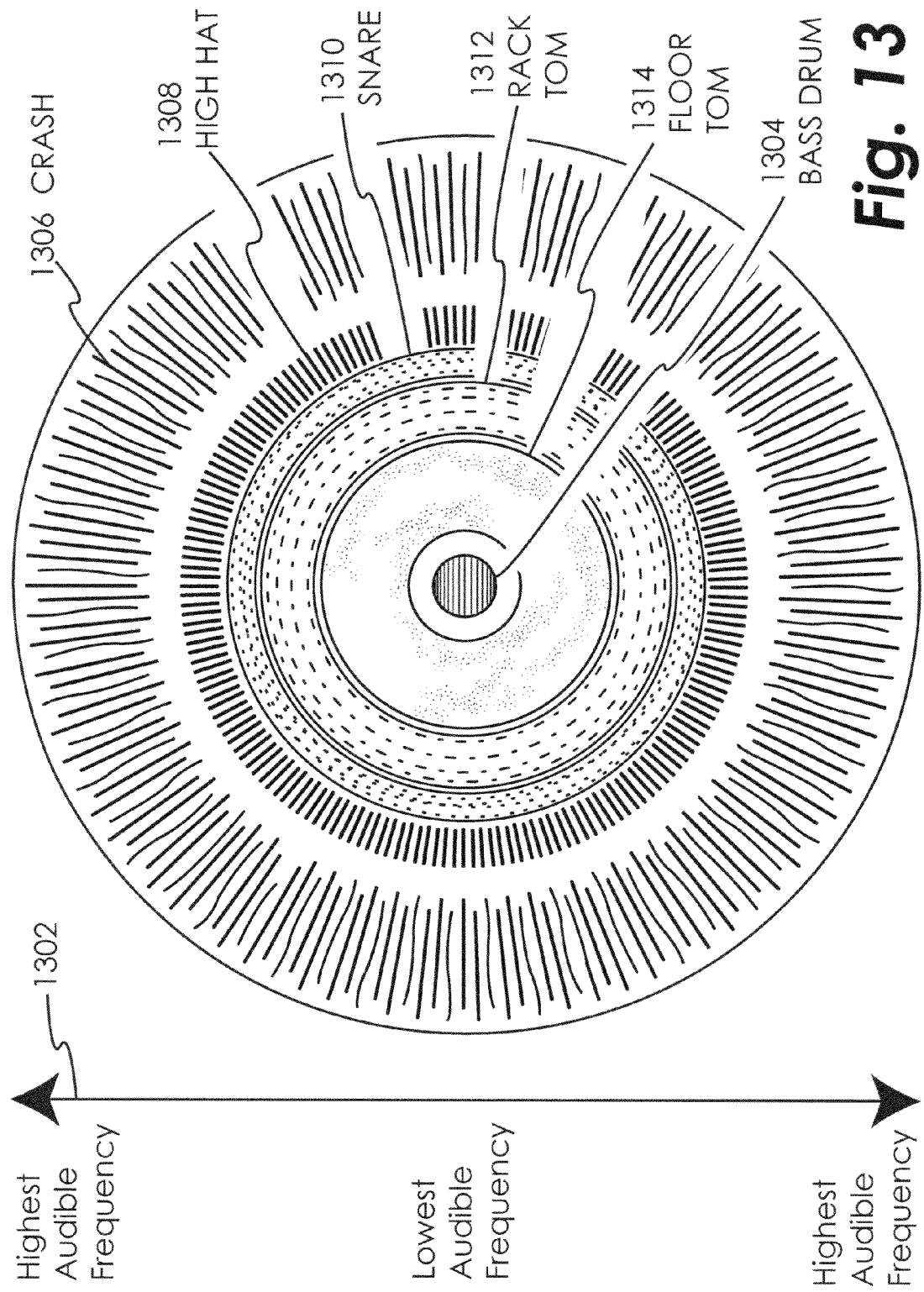
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
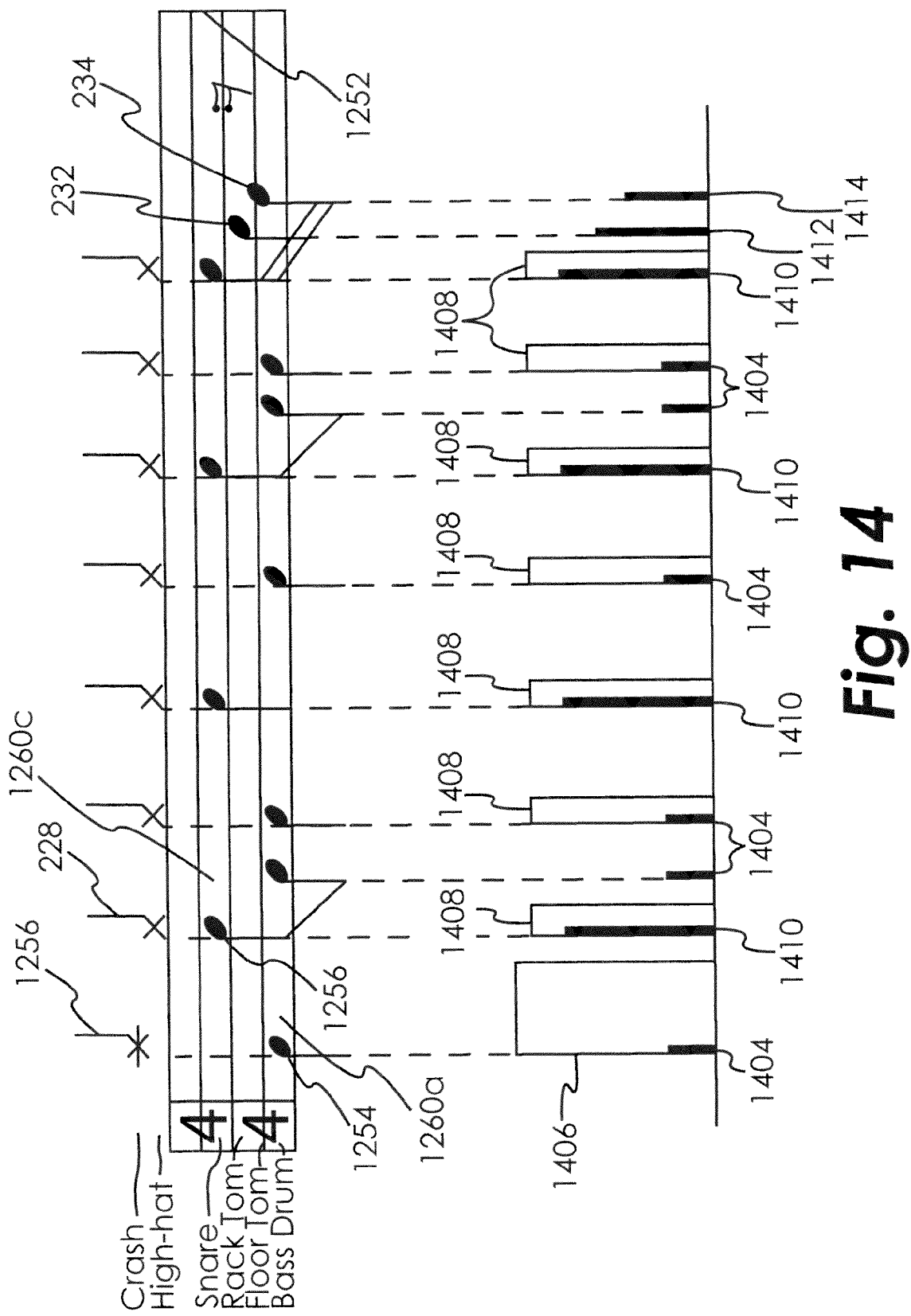
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260a of staff 1252. Likewise, bar 1410 (representing the snare drum) will be converted to a note 1256 in the second highest space 1260c of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

In addition to music education and composition, the above methods can be utilized in a system for visualizing and identifying environmental sounds, such as the auditory calls made by birds and other wildlife. Identification of such sounds can be extremely difficult when done purely "by ear," especially when the observer is unaware of which species to expect in a particular geographic area. One way to overcome this difficulty is to visualize the sound through color and geometry based on its tonal and rhythmic qualities using the methods described above. The system can be used to both distinguish between different types of environmental sounds and identify individual species based on their vocal characteristics and auditory patterns.

Figure 15:
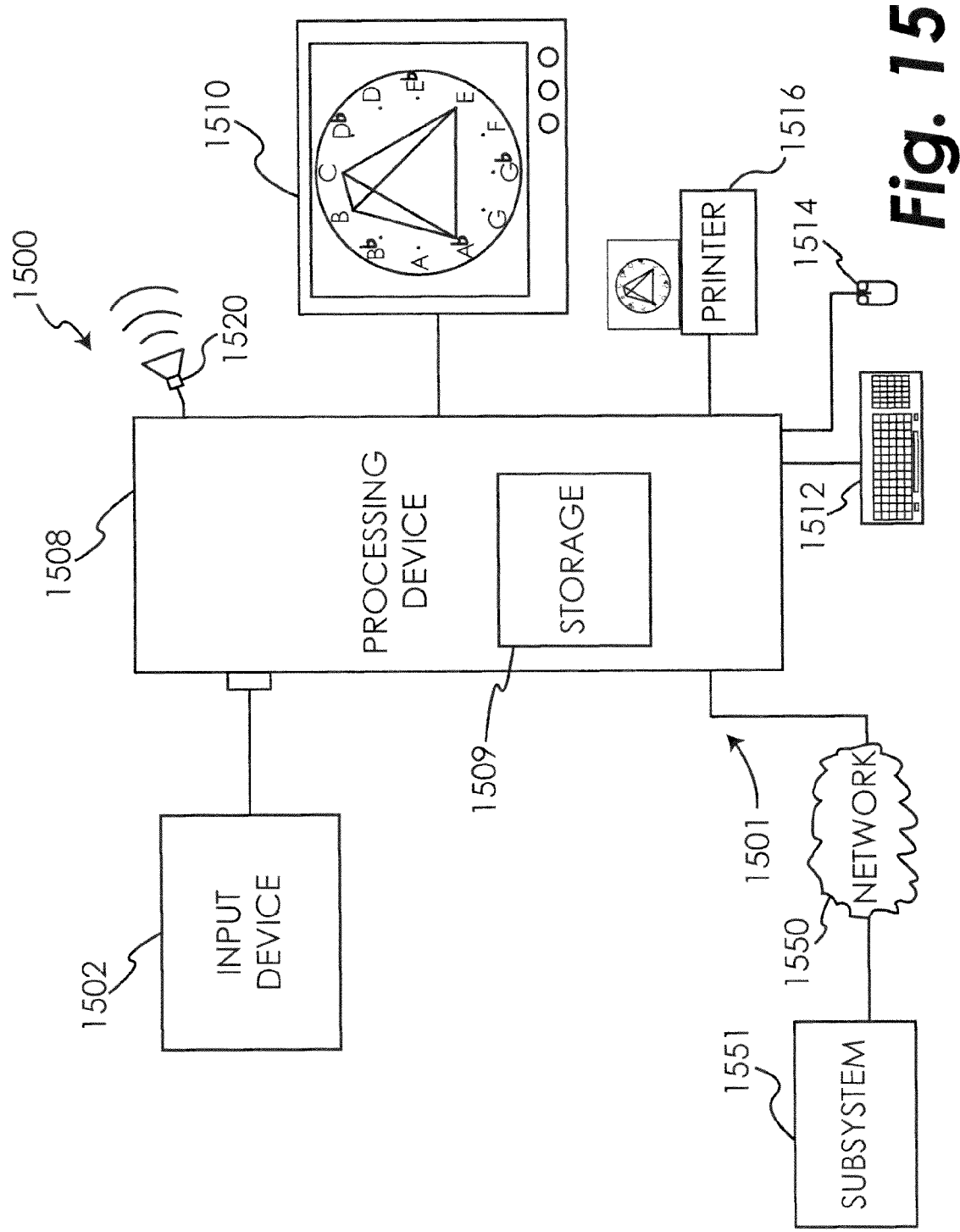
FIG. 15 is a schematic block diagram showing a system for archiving environmental sounds according to one embodiment.

FIG. 15 shows, in schematic form, one embodiment of an environmental, e.g., birds and other wildlife, sound archiving system 1500 according to the present disclosure. It is understood that one or more of the functions described herein may be implemented as either hardware or software, and the manner in which any feature or function is described does not limit such implementation only to the manner or particular embodiment described. The system 1500 may include a sound input device 1502, a speaker 1520, a processing device 1508, data storage device 1509, a display 1510, user input devices such as keyboard 1512 and mouse 1514, and a printer device 1516. These devices are coupled to allow the input of sensed sounds into the processing device so that the visual representations of the sounds may be processed, evaluated, displayed, printed or manipulated by users. The system is preferably configured to be portable such that users can easily carry the particular device in which system 1500 is implemented with them when they travel to locations in which bird or other wildlife sounds are likely to occur.

The input device 1602 may include a microphone, a digital audio device such as an MP3 device or CD player, an analog music player, a digital wave generator, a transponder and analog-to-digital converter, a digital audio file, or an input from a sound mixing board, as well as other input devices and systems. The input signal can also be in the form of a prerecorded or live audio signal.

The processing device 1508 may be implemented on a personal computer, a workstation computer, a laptop computer, a palmtop computer, a wireless terminal having computing capabilities (such as a cell phone having a Windows CE or Palm operating system), a dedicated embedded processing system, or the like. It will be apparent to those of ordinary skill in the art that other computer system architectures may also be employed.

In general, such a processing device 1508, when implemented using a computer, comprises a bus for communicating information, a processor coupled with the bus for processing information, a main memory coupled to the bus for storing information and instructions for the processor, a read-only memory coupled to the bus for storing static information and instructions for the processor. The display 1510 is coupled to the bus for displaying information for a computer user and the input devices 1512, 1514 are coupled to the bus for communicating information and command selections to the processor. A mass storage interface for communicating with data storage device 1509 containing digital information may also be included in processing device 1508 as well as a network interface for communicating with a network.

The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system. Display 1510 may be a liquid crystal device (LCD), a cathode ray tube (CRT), a plasma monitor, a holographic display, or other suitable display device. The mass storage interface may allow the processor access to the digital information in the data storage devices via the bus. The mass storage interface may be a universal serial bus (USB) interface, an integrated drive electronics (IDE) interface, a serial advanced technology attachment (SATA) interface or the like, coupled to the bus for transferring information and instructions. The data storage device 1509 may be a conventional hard disk drive, a floppy disk drive, a flash device (such as a jump drive or SD card), an optical drive such as a compact disc (CD) drive, digital versatile disc (DVD) drive, HD DVD drive, BLUE-RAY DVD drive, or another magnetic, solid state, or optical data storage device, along with the associated medium (a floppy disk, a CD-ROM, a DVD, etc.)

In general, the processor retrieves processing instructions and data from the data storage device 1509 using the mass storage interface and downloads this information into random access memory for execution. The processor then executes an instruction stream from random access memory or read-only memory. Command selections and information that is input at input devices 1512, 1514 are used to direct the flow of instructions executed by the processor. Equivalent input devices 1514 may also be a pointing device such as a conventional trackball device. The results of this processing execution are then displayed on display device 1510.

The processing device 1508 is configured to generate an output for viewing on the display 1510 and/or for driving the printer 1516 to print a hardcopy. Preferably, the video output to display 1510 is also a graphical user interface, allowing the user to interact with the displayed information.

The system 1500 may also include one or more subsystems 1551 substantially similar to subsystem 1501 and communicating with subsystem 1501 via a network 1550, such as a LAN, WAN or the internet. Subsystems 1501 and 1551 may be configured to act as a web server, a client or both and will preferably be browser enabled. Thus with system 1500, remote collaboration may occur between users.

In operation, input device 1502 senses signals that are to be archived and/or identified, creates signals representative of the sounds and applies them to the processing device 1508. Processing device 1508 creates tonal and/or rhythm visualization components, such as those described above, from the input signals which may be displayed on display 1510. The visualization components, whether in encoded or unencoded form, contain information relating to the encountered sounds, including, pitch, timbre, rhythm and volume, as non-limiting examples. These visualization components are preferably archived or stored in an encoded or digital format in data storage unit 1509 for use in future identifications. Pre-identified sounds may also be obtained as an identification library for archiving in data storage device 1509

In order to visualize the individual frequencies of input sounds, the system 1500 can implement software operating as an audio signal or note extractor. The audio extractor examines the signals received by the sound input device 1502 and determines which primary frequencies are present. The frequency content is then mapped to certain colors and positions within a tonal circle or helix and displayed to the user. Various methods are known in the art for determining the frequency of an input signal including, but not limited to, frequency counters and band pass filters. Certain audio frequency extraction methods are also described in U.S. Patent Application Ser. No. 61/025,374 filed Feb. 1, 2008 entitled "Apparatus and Method for Visualization of Music Using Note Extraction" which is hereby incorporated by reference in its entirety.

By viewing the displayed visualizations, the user can begin to associate a given shape within the circle or helix as corresponding to particular known sound, e.g., the call of a certain species of bird. In certain embodiments, the system will automatically compare the shape and color of an input sound with a list of known sounds stored in memory. The system can then display the name of a recognized species for the user along with the tonal or rhythmic visualization. In other embodiments, the system will display a visualization of the input sound and allow the user to compare it to selected visualizations of known sounds stored in memory. In some embodiments, the two visualizations may be superimposed on display 1510 to facilitate comparison by the user.

In addition to using standard musical intervals in the circular graphical representations, however, much smaller frequency gradations can be displayed on the tonal circle or helix by slowing shifting the color and placement of the interval lines on the circle or helix depending on the input frequency. This is particularly helpful in the case of bird calls, where the 'notes' of the bird call are not normally based on any standard pitch (as compared to human generated compositions). For example, while a bird will often repeat the same group of pitches with distinctive transitions therebetween, the sounded frequencies will not necessarily correspond to any notes on a piano. Birds will, however, often maintain a consistent relationship between the individual pitches of a call from both a tonal and rhythmic standpoint.

In certain embodiments, the system will also compensate for any differences in the overall pitch between the auditory calls of individual animals within the same species. For example, if one bird begins a particular call at 2200 Hz, but uses the same intervallic relationships between pitches as another bird that begins its call at 2250 Hz, the system will still recognize them as being from the same species, assuming other factors do not disqualify the match. In the same way, a user viewing the two different calls on a display will still be able to recognize the calls as being from the same species of bird because the relative shape of the visualizations will be the same (just rotated to some degree in relation to one another).

Figure 16:
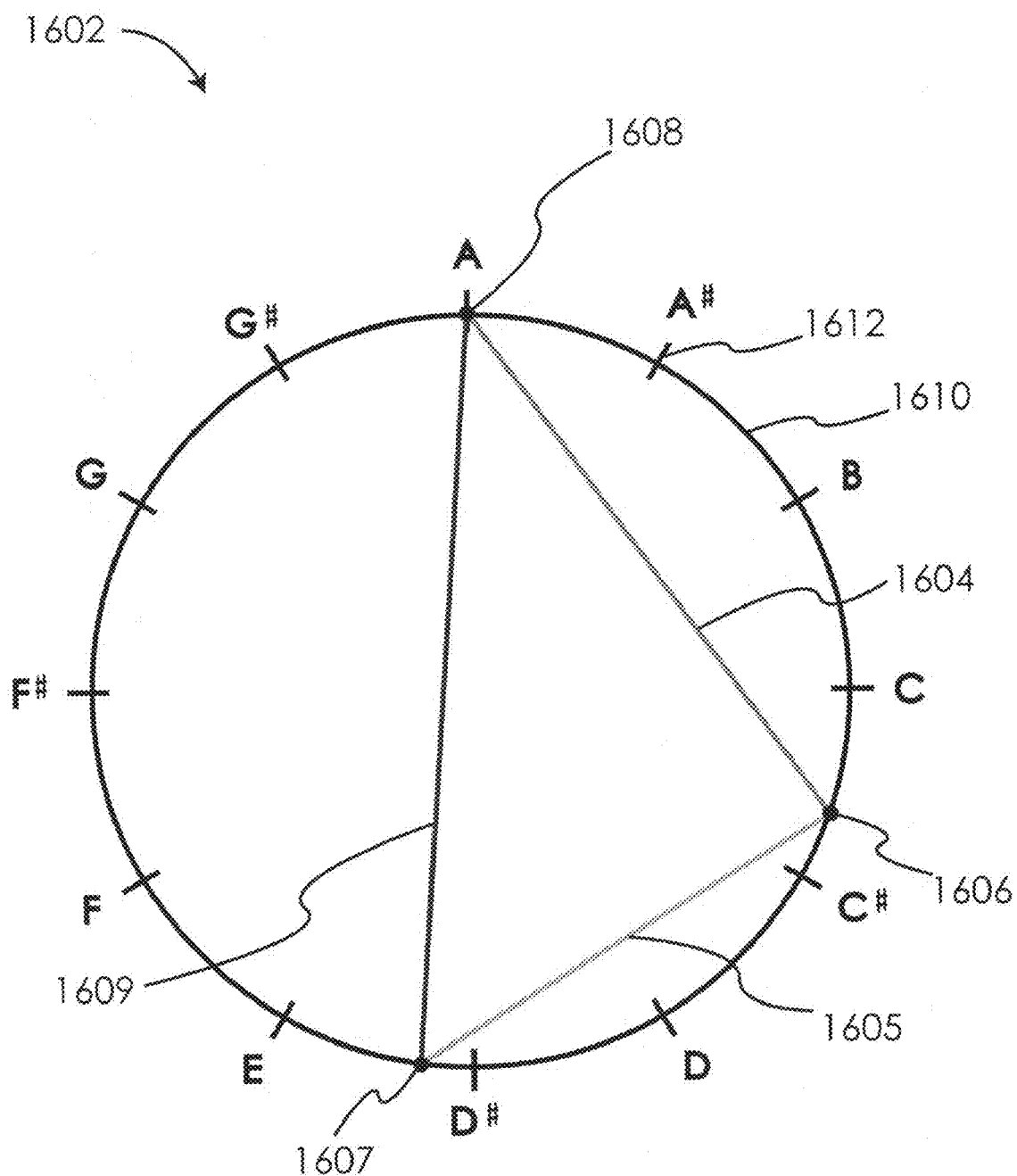
FIG. 16 depicts a visual representation of an input sound according to one embodiment.

FIG. 16 shows an example of a visualization for an input sound according to one embodiment. In this case, the input sound has three main frequency shifts or components, with the color of each line determined by the interval between two of the sounded frequencies. In this case, frequency element 1608 is a very close to an "A," frequency element 1606 has a frequency falling somewhere between a "C" and a "C♯," and frequency element 1607 has a frequency falling somewhere between a "D♯" and an "E." This results in a yellowish-green line 1604 being displayed between elements 1608 and 1606, a yellowish-orange line 1605 being displayed between elements 1606 and 1607, and a blueish-purple line 1609 being displayed between elements 1607 and 1608. As described herein, the visualization 1602 can be labeled with frequency gradations 1612 on circle 1610 according to notes in a musical scale as shown or be labeled with any degree of frequency gradations (e.g., 440 Hz, 450 Hz, etc.), with the resolution and format of the frequency gradations 1612 configurable by the user.

In addition to tonal visualizations, the rhythm visualizations described hereinabove can be utilized to convey the rhythmic characteristics of sensed sounds. Instead of corresponding to a musical instrument, however, the visualizations can follow a more generalized format in which lower frequency sounds, such as those in a lion's roar, are displayed as structures with a smaller diameter (much like a bass drum) and higher frequency sounds, such as those made by a shrieking bird, are displayed as structures with larger diameters (much like a cymbal), to give just one non-limiting example. These rhythmic visualizations can provide an additional basis by which the user or the automated processing software can evaluate the various sensed sounds to be identified and archived.

While the disclosure has been illustrated and described in detail in the drawings and foregoing description, the same is to be considered as illustrative and not restrictive in character, it being understood that only the preferred embodiments have been shown and described and that all changes, modifications and equivalents that come within the spirit of the disclosure provided herein are desired to be protected. The articles "a," "an," "said," and "the" are not limited to a singular element, and may include one or more such elements.

What is claimed:

1. An environmental sound recognition system, comprising:
    a sound input device;
    a processing device operatively connected to said sound input device; and
    a display operatively connected to said processing device; wherein:
        said processing device executes computer readable code to create a first visual representation of a first sound sensed by the sound input device for output on the display; wherein:
        said first visual representation is evaluated to determine the identity of a wildlife species; and wherein:
        said first visual representation is generated according to a method comprising the steps of:
        (a) placing twelve labels in a pattern of a circle, said twelve labels corresponding to twelve respective notes in an octave, such that moving clockwise or counter-clockwise between adjacent ones of said labels represents a first frequency interval;
        (b) identifying an occurrence of a first frequency within the first sound;
        (c) identifying an occurrence of a second frequency within the first sound;
        (d) identifying a first label corresponding to the first frequency;
        (e) identifying a second label corresponding to the second frequency;
        (f) creating a first line connecting the first label and the second label, wherein:
            (1) the first line is a first color if the first frequency and the second frequency are separated by the first frequency interval;
            (2) the first line is a second color if the first frequency and the second frequency are separated by a first multiple of the first frequency interval;
            (3) the first line is a third color if the first frequency and the second frequency are separated by a second multiple of the first frequency interval;
            (4) the first line is a fourth color if the first frequency and the second frequency are separated by a third multiple of the first frequency interval;
            (5) the first line is a fifth color if the first frequency and the second frequency are separated by a fourth multiple of the first frequency interval; and
            (6) the first line is a sixth color if the first frequency and the second frequency are separated by a fifth multiple of the first frequency interval.

2. The system of claim 1, wherein step (a) further comprises arranging each of the twelve labels to be substantially evenly spaced from each adjacent label.

3. The system of claim 2, wherein step (a) further comprises arranging each of the twelve labels to be spaced 30 degrees from each adjacent label.

4. The system of claim 1, wherein the first color is red, the second color is orange, the third color is yellow, the fourth color is green, the fifth color is blue and the sixth color is purple.

5. The system of claim 1, wherein:
    the first color has a first wavelength that is larger than a second wavelength of the second color; and
    the second wavelength is larger than a third wavelength of the third color;
    the third wavelength is larger than a fourth wavelength of the fourth color;
    the fourth wavelength is larger than a fifth wavelength of the fifth color; and
    the fifth wavelength is larger than a sixth wavelength of the sixth color.

6. The system of claim 1, wherein said first sound is generated by a bird.

7. The system of claim 1, further comprising the steps of:
    (g) identifying an occurrence of a third frequency within said sound;
    (h) identifying a third label corresponding to the third frequency;
    (i) creating a second line connecting the second label and the third label; and
    (j) creating a third line connecting the third label and the first label.

8. An environmental sound recognition system, comprising:
    a sound input device;
    a processing device operatively connected to said sound input device; and a display operatively connected to said processing device; wherein:
said processing device executes computer readable code to create a first visual representation of a first sound sensed by the sound input device for output on the display;
wherein:
said first visual representation is evaluated to determine the identity of a wildlife species; and
wherein:
said first visual representation is generated according to a method comprising the steps of:
(a) placing twelve labels in a pattern of a circle, said twelve labels corresponding to twelve respective frequencies, such that moving clockwise or counter-clockwise between adjacent ones of said labels represents a first frequency interval;
(b) identifying an occurrence of a first frequency within the first sound;
(c) identifying an occurrence of a second frequency within the first sound;
(d) identifying a first point on the circle, said first point corresponding to the first frequency;
(e) identifying a second point on the circle, said second point corresponding to the second frequency;
(f) creating a first line connecting the first point and the second point, wherein:
(1) the first line is a mixture of a first color and a second color if the first frequency and the second frequency are separated by more than the first frequency interval and less than a first multiple of the first frequency interval;
(2) the first line is a mixture of a second color and a third color if the first frequency and the second frequency are separated by more than the first multiple of the first frequency interval and less than a second multiple of the first frequency interval;
(3) the first line is a mixture of a third color and a fourth color if the first frequency and the second frequency are separated by more than the second multiple of the first frequency interval and less than a third multiple of the first frequency interval;
(4) the first line is a mixture of a fourth color and a fifth color if the first frequency and the second frequency are separated by more than the third multiple of the first frequency interval and less than a fourth multiple of the first frequency interval;
(5) the first line is a mixture of a fifth color and a sixth color if the first frequency and the second frequency are separated by more than the fourth multiple of the first frequency interval and less than a fifth multiple of the first frequency interval.

9. The system of claim 8, wherein the first color is red, the second color is orange, the third color is yellow, the fourth color is green, the fifth color is blue and the sixth color is purple.

10. The system of claim 8, wherein:
the first color has a first wavelength that is larger than a second wavelength of the second color; and
the second wavelength is larger than a third wavelength of the third color;
the third wavelength is larger than a fourth wavelength of the fourth color;
the fourth wavelength is larger than a fifth wavelength of the fifth color; and
the fifth wavelength is larger than a sixth wavelength of the sixth color.

11. The system of claim 8, wherein said first sound is generated by a bird.

12. The system of claim 8, further comprising the steps of:
(g) identifying an occurrence of a third frequency within said sound;
(h) identifying a third label corresponding to the third frequency;
(i) creating a second line connecting the second label and the third label; and
(j) creating a third line connecting the third label and the first label.

13. An environmental sound recognition system, comprising:
a sound input device;
a processing device operatively connected to said sound device; and
a display operatively connected to said processing device; wherein:
said processing device executes computer readable code to create a first visual representation of a first sound sensed by the sound input device for output on the display;
wherein:
said first visual representation is evaluated to determine the identity of a wildlife species; and
wherein:
said first visual representation is generated according to a method comprising the steps of:
(a) providing a plurality of labels in a pattern of a helix, wherein:
(1) each turn of the helix has a group of twelve labels corresponding to twelve respective notes in a respective octave; and
(2) moving clockwise or counter-clockwise on the helix between any one of said labels represents a musical half-step;
(b) identifying an occurrence of a first frequency within the first sound;
(c) identifying an occurrence of a second frequency within the first sound;
(d) identifying a first point on the helix, said first point corresponding to the first frequency;
(e) identifying a second point on the helix, said second point corresponding to the second frequency;
(f) creating a first line connecting the first point and the second point, wherein:
(1) the color of the first line is a mixture of a first color and a second color if the first frequency and the second frequency are separated by more than a musical half step and less than a musical whole step;
(2) the color of the first line is a mixture of the second color and a third color if the first frequency and the second frequency are separated by more than a musical whole step and less than a musical minor third;
(3) the color of the first line is a mixture of the third color and a fourth color if the first frequency and the second frequency are separated by more than a musical minor third and less than a musical major third;
(4) the color of the first line is a mixture of the fourth color and a fifth color if the first frequency and the second frequency are separated by more than a musical major third and less than a musical perfect fourth; and (5) the color of the first line is a mixture of the fifth color and a sixth color if the first frequency and the second frequency are separated by more than a musical perfect fourth and less than a musical tri-tone.

14. The system of claim 13, wherein the first color is red, the second color is orange, the third color is yellow, the fourth color is green, the fifth color is blue and the sixth color is purple.

15. The system of claim 13, wherein:
the first color has a first wavelength that is larger than a second wavelength of the second color; and
the second wavelength is larger than a third wavelength of the third color;
the third wavelength is larger than a fourth wavelength of the fourth color;
the fourth wavelength is larger than a fifth wavelength of the fifth color; and
the fifth wavelength is larger than a sixth wavelength of the sixth color.

16. The system of claim 13, wherein step (a) further comprises arranging the labels to be substantially evenly spaced around the helix.

* * * * *